United States Patent
Tada et al.

(10) Patent No.: US 6,490,583 B2
(45) Date of Patent: *Dec. 3, 2002

(54) INFORMATION REGISTRATION METHOD AND DOCUMENT INFORMATION PROCESSING APPARATUS

(75) Inventors: Katsumi Tada, Kawasaki (JP); Kazuhiro Hashimoto, Otsu (JP); Shigeru Kameda, Takarazuka (JP); Noriyuki Yamasaki, Yokohama (JP); Akio Azuma, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/935,652

(22) Filed: Aug. 24, 2001

(65) Prior Publication Data

US 2001/0056421 A1 Dec. 27, 2001

Related U.S. Application Data

(63) Continuation of application No. 09/695,025, filed on Oct. 25, 2000, which is a continuation of application No. 09/025,071, filed on Feb. 17, 1998, now Pat. No. 6,178,422.

(30) Foreign Application Priority Data

Feb. 19, 1997 (JP) ............................................. 9-051089

(51) Int. Cl.[7] .............................. G06F 17/30; H04L 9/00
(52) U.S. Cl. ................................. 707/9; 707/6; 713/200
(58) Field of Search ........................ 707/1, 3–6, 9, 707/100; 713/201, 202

(56) References Cited

U.S. PATENT DOCUMENTS

| 5,335,346 A | 8/1994 | Fabbio |
| 5,414,844 A | 5/1995 | Wang |
| 5,504,889 A | 4/1996 | Burgess |
| 5,737,737 A | 4/1998 | Hikida et al. |
| 5,787,175 A | 7/1998 | Carter |
| 5,802,518 A | 9/1998 | Karaev et al. |
| 5,864,871 A | 1/1999 | Kitain et al. |
| 5,941,947 A | 8/1999 | Brown et al. |
| 6,178,422 B1 * | 1/2001 | Tada et al. ............ 707/6 |
| 6,334,130 B1 * | 12/2001 | Tada et al. ............ 707/6 |

FOREIGN PATENT DOCUMENTS

| EP | 398645 | 11/1990 |
| EP | 458718 | 11/1991 |
| EP | 547990 | 6/1993 |
| WO | WO 96/17284 | 6/1996 |
| WO | WO 96/27155 | 9/1996 |

OTHER PUBLICATIONS

Proceedings of the '93 Intl. Carnahan Conference on Security Technology, Oct. 1993, P.S. Deng et al, pp. 159–163.

* cited by examiner

Primary Examiner—Hosain T. Alam
(74) Attorney, Agent, or Firm—Mattingly, Stanger & Malur, P.C.

(57) ABSTRACT

In a document information processing apparatus handling a large amount of documents, when a document is registered, retrieval data for document retrieval is created for each registered document. Moreover, for each registered document, there is produced an access control table in which information indicating accessibility of groups including users as document retrievers for the document is registered. When a user desires to retrieve a document, accessibility of the user as the retriever is determined in accordance with the access control table for documents retrieved with retrieval data.

3 Claims, 8 Drawing Sheets

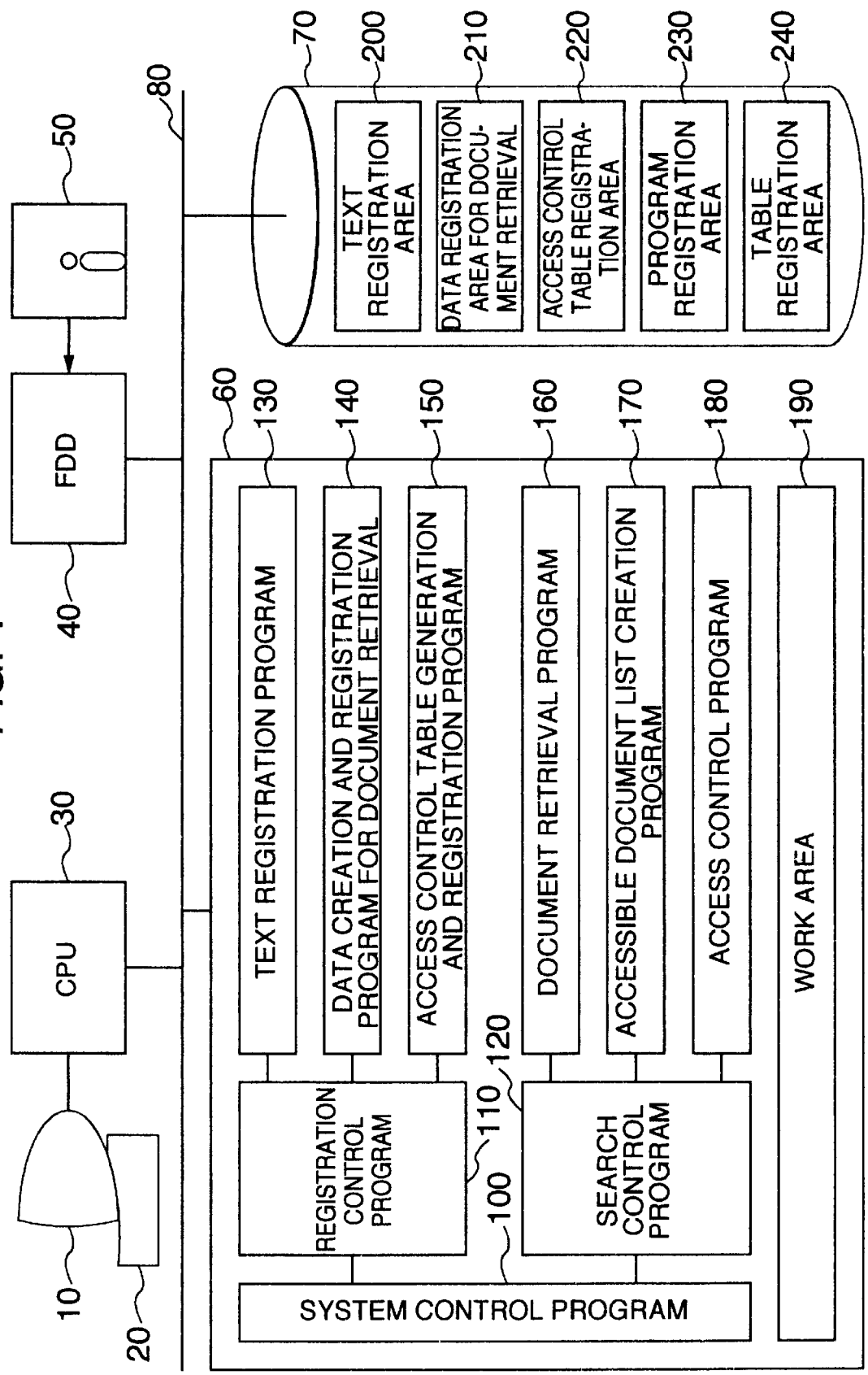

FIG.2

| GROUP NO. | OUTLINE OF GROUP |
|---|---|
| 1 | GROUP OF SYSTEM MANAGERS OF DOCUMENT MANAGEMENT SYSTEM |
| 2 | GROUP OF IN-HOUSE USERS OF DOCUMENT MANAGEMENT SYSTEM |
| 3 | GROUP OF USERS BELONGING TO EDUCATIONAL FACILITIES SUCH AS UNIVERSITIES |
| 4 | GROUP OF USERS BELONGING TO PUBLIC ORGANIZATIONS SUCH AS GOVERNMENT OFFECES |
| 5 | GROUPS OF OTHER GENERAL USERS |

FIG.3

| USER IDENTIFICA-TION NO. | USER NAME | GROUP NO. | | | | |
|---|---|---|---|---|---|---|
| | | 1 | 2 | 3 | 4 | 5 |
| 1 | Suzuki | 1 | 1 | 0 | 0 | 0 |
| 2 | Nakano | 0 | 1 | 0 | 0 | 0 |
| 3 | Yoshida | 0 | 0 | 0 | 0 | 1 |
| 4 | Yamada | 0 | 0 | 0 | 1 | 0 |
| ⋮ | ⋮ | ⋮ | ⋮ | ⋮ | ⋮ | ⋮ |

FIG.6

```
START
  │
  ▼
┌──────────────────────────────────────┐
│ READ TEXT DATA OF REGISTERED DOCUMENT │
│ FROM TEXT REGISTRATION AREA ON        │──1200
│ MAGNETIC DISK AND LOAD THE DATA IN WORK│
│ AREA OF MAIN MEMORY                   │
└──────────────────────────────────────┘
  │
  ▼
┌──────────────────────────────────────┐
│ CREATE RETRIEVAL DATA FOR DOCUMENT    │
│ RETRIEVAL IN WORK AREA IN ACCORDANCE  │──1210
│ WITH TEXT DATA LOADED IN WORK AREA    │
└──────────────────────────────────────┘
  │
  ▼
┌──────────────────────────────────────┐
│ STORE RETRIEVAL DATA CREATED IN WORK  │
│ AREA IN DATA REGISTRATION AREA FOR    │──1220
│ DOCUMENT RETRIEVAL ON MAGNETIC DISK   │
└──────────────────────────────────────┘
  │
  ▼
END
```

FIG.8

| DOCUMENT NO.: | 1 | 2 | 3 | 4 | 5 | 6 | 7 | ... |
|---|---|---|---|---|---|---|---|---|
| GROUP NO.: 1 | 1 | 1 | 1 | 1 | 1 | 1 | 1 | ... |
| 2 | 0 | 1 | 0 | 0 | 1 | 1 | 0 | ... |
| 3 | 0 | 0 | 0 | 0 | 1 | 1 | 0 | ... |
| 4 | 0 | 0 | 0 | 0 | 0 | 1 | 0 | ... |
| 5 | 0 | 0 | 0 | 0 | 0 | 1 | 0 | ... |

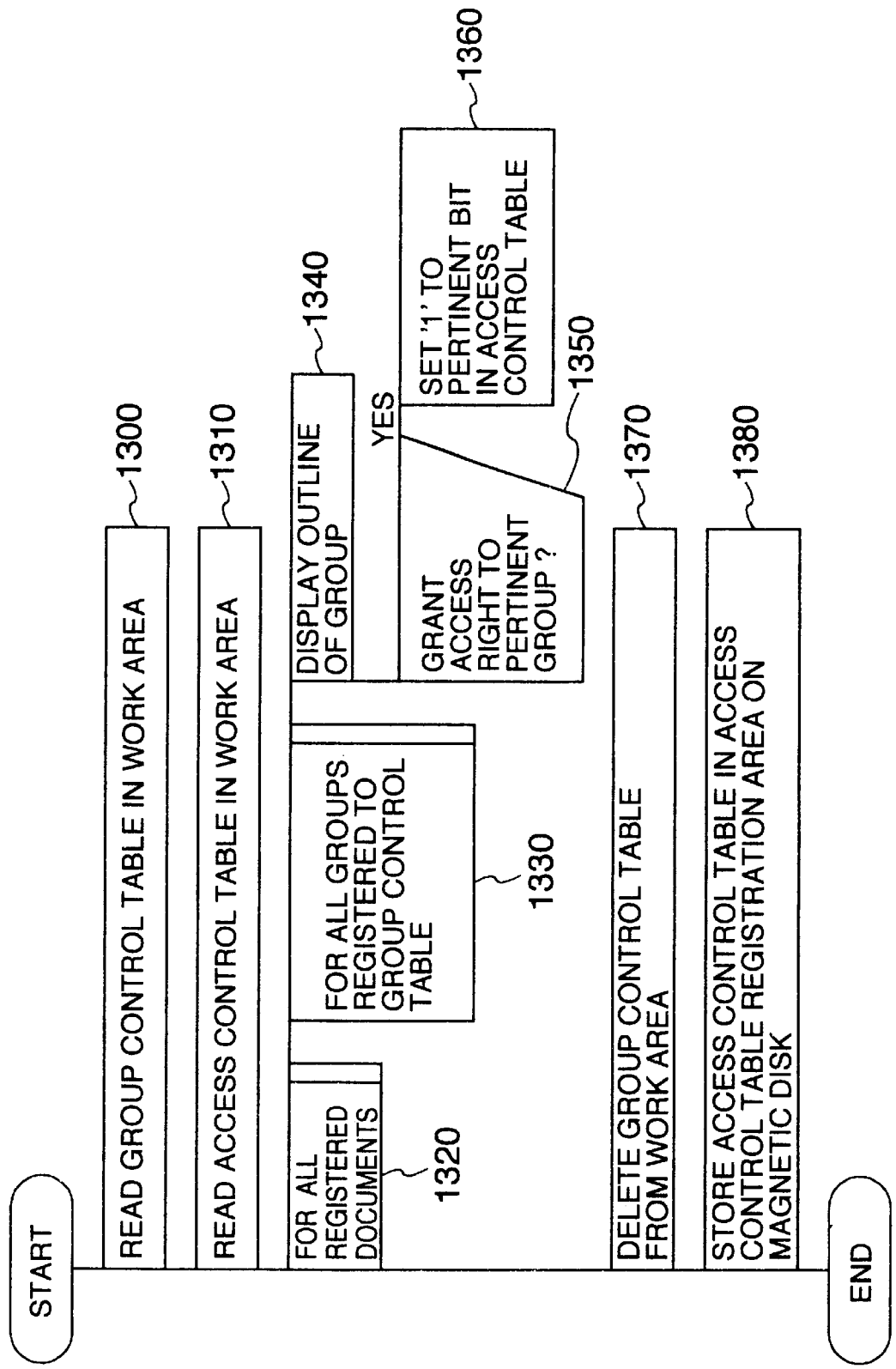

INFORMATION REGISTRATION METHOD AND DOCUMENT INFORMATION PROCESSING APPARATUS

This is a continuation application of U.S. Ser. No. 09/695,025, filed Oct. 25, 2000, which is a continuation application of Ser. No. 09/025,071, filed on Feb. 17, 1998, now U.S. Pat. No. 6,178,422.

BACKGROUND OF THE INVENTION

The present invention relates to document management to conduct an access control operation in which a document to be outputted as a retrieval result under a retrieval condition specified by a retriever and/or a document to be similarly displayed are/is restricted or controlled in accordance with an authorized level of the retriever. In relation to these application fields, the present invention relates in particular to a document management method and a document management apparatus for supplying a large amount of document information of an electronic library system and the like to users via a wide area network such as Internet and Intranet.

With recent rapid development and popularization of Internet, there can be seen a trend of supplying document information via a network to users. Particularly, in a large-sized document information system such as an electronic library system, there appears a need to provide a large volume of document information to users through a wide area network such as Internet and Intranet.

In such a situation, World Wide Web (WWW) using a protocol called Hyper-Text Transfer Protocol (HTTP) capable of delivering document information to any place in the world is increasingly employed in document management systems for various uses thanks to development of high-performance retrieval functions.

Furthermore, on the other hand, with increase in the amount of document information to be supplied to users, to provide a highly-developed service such as management of document information including secret information and management of charging operation, there is required an access control function in which a result of document retrieval and document to be displayed for a user are restricted in accordance with an authorized access level of the user.

In the prior art, there has been adopted a method of implementing the access control operation in which when a user accesses a document management system, authentication of the user is carried out to conduct an access control operation for each database registered to the system.

That is, when accessing a database in this method, the user inputs a user name and a password to the document management system. The system then achieves an operation to authenticate the user on the basis of the inputted user name and password. The system allows the user completely authenticated to access databases for which access authentication has been already established, thereby conducting the access control operation.

However, in the method above of accomplishing the access control operation for each database through the user authentication, there arises the following problem. Namely, it is difficult to carry out an access control operation in a plurality of levels corresponding to groups to which users belong. This problem becomes remarkable especially when the system includes a large-sized document database.

For example, in a case in which documents to be opened to users belonging to universities and public institutions are required to be discriminated from those to be opened to general users including private firms and companies, it is necessary to separately register these documents in the document management system.

Namely, when users having different authorized access levels are allowed to access a document, the document is required to be registered to a plurality of databases. This accordingly increases the quantity of necessary resources such as magnetic disks and memories, which results in a problem of increase in the cost of the document management system.

Additionally, processing steps such as data registration and backup steps become complex and hence there occurs a problem of conspicuous deterioration in the operation management and system maintenance. Furthermore, when an authorized access level is desired to be altered, document databases are required to be again registered to the system, which leads to a problem of a drawback in expandability.

These problems related to the cost, operation management, maintenance, and expandability of the system appear as far more serious problems when the number of access control levels is increased, for example, in a case in which documents to be supplied to users are limited or restricted in accordance with a contract fee of each user in a document management system conducting management of charging operation.

SUMMARY OF THE INVENTION

In accordance with the present invention, there is provided a method of solving this problem in which for each document registered to the document management system, users allowed to access the document are registered as attribute information for each group to which the users belong.

In this method, however, when a user conducts a retrieval operation in the document management system, it is necessary to refer to the attribute information for all documents retrieved as a result of the retrieval operation to determine whether or not the user belongs to a group of users allowed to access the document. Consequently, there arises a problem of elongation in the retrieval time.

Moreover, in accordance with the present invention, there is specifically provided the following configuration. Thanks to the configuration, there can be implemented document management developing a remarkable advantage in the cost, operation management, maintenance, and expandability of the system for a large volume of document information of an electronic library system and the like in which the access control operation can be conducted in accordance with groups to which users belong.

The present invention provides the following configuration.

The configuration includes a text registration step of registering, at registration of a document, a registration document as text data; a data creation and registration step for data retrieval of creating retrieval data for the text data registered in the text registration step and registering the created data; and an access control table creation and registration step of assigning to the document completely registered through the text registration step and the data creation and registration step for data retrieval bit information corresponding to a user group beforehand registered and thereby creating and registering an access control table including information indicating whether or not a user belonging to the group is allowed to access the document.

In addition, there is included an access control table created by assigning bit information corresponding to a beforehand registered user group to a registered document, the table including information indicating whether or not a user belonging to the group is allowed to access the document; a document retrieval step of retrieving, in a retrieval operation of a document, the document by referring to retrieval data beforehand registered; an accessible document list creation step of extracting from the access table document lists including entries thereof associated with a user group to which a retriever of the document belongs, conducting a conjunction operation between the document lists, thereby creating an accessible document list including a list of documents which can be accessed by the retriever; and an access control step of accomplishing a disjunction operation between a document retrieval result obtained through the document retrieval step and the accessible documents created through the accessible list creation step and thereby conducting document access control processing for the retriever in association with the document retrieval result.

In this connection, the document retrieval step and the accessible document list creation step may be executed in an arbitrary order with respect to time. That is, these steps may be concurrently executed. In such a case, the steps may be overlapped with each other. Furthermore, it may also be possible to first execute any one thereof.

Additionally, the document management method may include a user management table indicating a correspondence between each retriever and the user group assigned to the retriever and a step of conducting a retrieval operation through the user management table in response to a specification from a retriever and extracting user groups to which the retriever belongs.

Moreover, there is provided a configuration which includes text registration means for registering, at registration of a document, a registration document as text data; data creating and registering means for data retrieval of creating retrieval data for the text data registered in the text registration step and registering the created data, and access control table creating and registering means for assigning to the document completely registered through the text registration step and the data creation and registration step for data retrieval bit information corresponding to a user group beforehand registered and thereby creating and registering an access control table including information indicating whether or not a user belonging to the group is allowed to access the document.

Incidentally, the configuration may be implemented as a document information processing apparatus capable of retrieving document information in response to an input from a user. The apparatus includes an access control table created by assigning bit information corresponding to a beforehand registered user group to a registered document, the table including information indicating whether or not a user belonging to the group is allowed to access the document, document retrieving means for retrieving, in a retrieval operation of a document, the document by referring to retrieval data beforehand registered, accessible document list creating means for creating from the access table an accessible document list including lists of documents which can be accessed by the retriever, wherein documents which are obtained as a result of the retrieval by the document retrieving means and which are associated with the accessible document list are allowed to be accessed by the retriever. In other words, at least one of the document retrieving means, the accessible document list creating means, and the access control table may be disposed in a device other than the document information processing apparatus.

Moreover, the configuration includes an access control table generated by assigning bit information corresponding to a beforehand registered user group to a registered document, the table including information indicating whether or not a user belonging to the group is allowed to access the document, document retrieving means for retrieving, in a retrieval operation of a document, the document by referring to retrieval data beforehand registered, accessible document list creating means for extracting from the access control table document lists including entries thereof associated with a user group to which a retriever of the document belongs, conducting a conjunction operation between the document lists, thereby creating an accessible document list including which is a list of documents which can be accessed by the retriever, and access control means for accomplishing a disjunction operation between a document retrieval result obtained through the document retrieval step and the accessible documents created through the accessible list creation step and thereby conducting document access control processing for the retriever in association with the document retrieval result.

The configuration may further include a user management table indicating a correspondence between each retriever and the user group assigned to the retriever and means for conducting a retrieval operation through the user management table in response to a specification from a retriever and extracting user groups to which the retriever belongs.

BRIEF DESCRIPTION OF THE DRAWINGS

The objects and features of the present invention will become more apparent from the consideration of the following detailed description taken in conjunction with the accompanying drawings in which:

FIG. 1 is a diagram showing the configuration of an embodiment of the present invention;

FIG. 2 is a diagram showing an example of the group control table in an embodiment of the present invention;

FIG. 3 is a diagram showing an example of the user management table in an embodiment of the present invention;

FIG. 6 is a program analysis diagram showing the contents of processing of the data creation and registration program for data retrieval in an embodiment of the present invention;

FIG. 7 is a program analysis diagram showing the contents of processing of the access control table creation and registration program in an embodiment of the present invention;

FIG. 8 is a diagram showing the access control table in an embodiment of the present invention;

DESCRIPTION OF THE PREFERRED EMBODIMENTS

Figure 4:
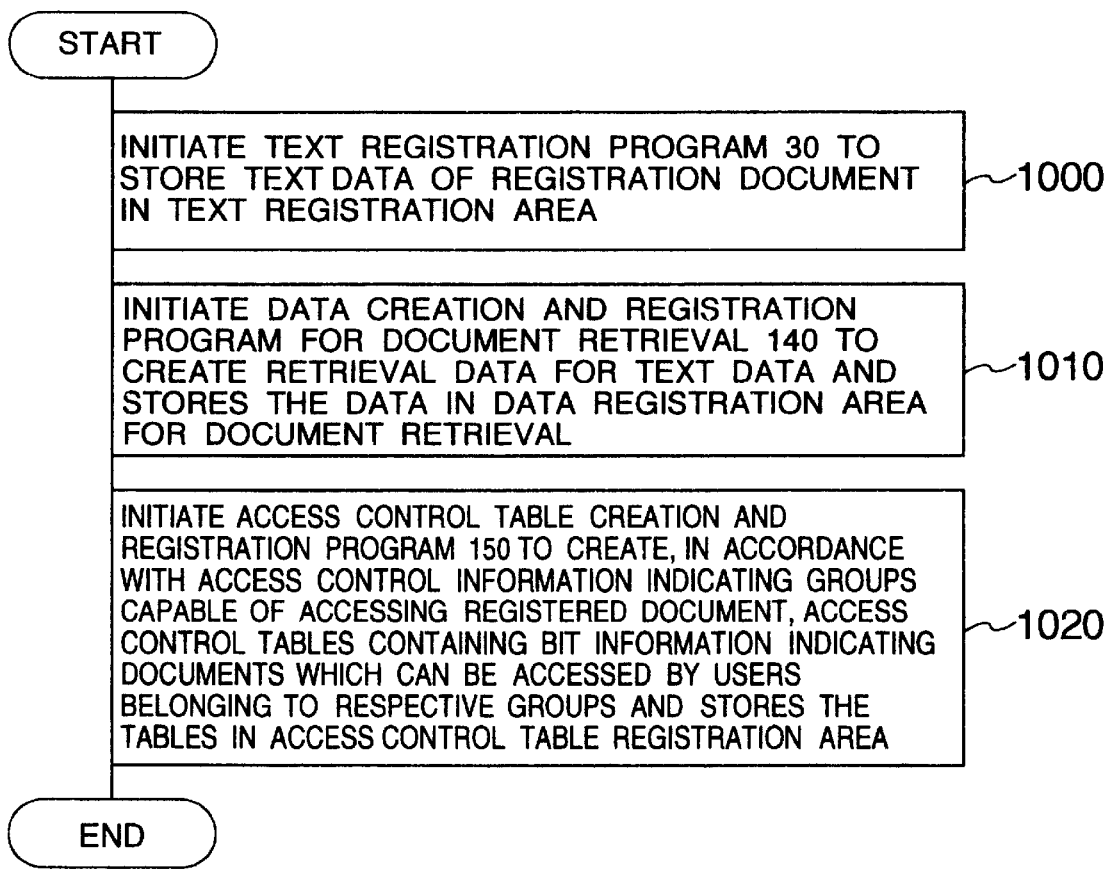
FIG. 4 is a program analysis diagram showing an outline of document registration processing in an embodiment of the present invention.

FIG. 1 shows an embodiment of the document management system of the present invention.

The system shown in FIG. 1 includes the following constituent elements, namely, a display 10 to display thereon a retrieval result, a keyboard 20 to input therefrom commands for registration and retrieval operations, a central processing unit (CPU) 30 to execute registration processing and retrieval processing, a floppy disk driver 40 to read data from a floppy disk, a floppy disk 50 on which document data to be registered to a database is stored, a main memory 60 to temporarily store therein programs and data for the registration and retrieval operations, and a magnetic disk 70 to store therein various data items and programs and a bus 80 to connect these units to each other.

In the main memory 60, there are loaded from the magnetic disk 70 a system control program 100, a registration control program 110, a retrieval control program 120, a text registration program 130, a data creation and registration program for document retrieval 140, an access control table creation and registration program 150, a document retrieval program 160, and an access control program 170. Moreover, a work area 190 is reserved in the memory 60.

Additionally, on the magnetic disk 70, there are reserved a text registration area 200, a data registration area for data retrieval 210, a registration area for various programs 230, and a registration area for various tables 240. Although the embodiment includes a magnetic disk, the present invention is not restricted by this embodiment. Namely, there may be used any device in which the areas above can be provided.

In this regard, although these registration areas are reserved on the magnetic disk 70 in this embodiment, it may also possible to reserve these areas in another secondary storage such as a magneto-optical disk device.

The configuration of the embodiment has been described.

Next, description will be given of the processing flow of this embodiment. In the embodiment, when databases are created, the system control program 100 beforehand generates a group control table shown in FIG. 2 and a user control table shown in FIG. 3 and stores these tables in the table registration area 240.

In other words, to the group control table, identification numbers of groups for which an access control operation is conducted in the document management system and an outline of each of the groups are beforehand registered.

Furthermore, stored in the user management table is information to identify groups to which each user belongs. That is, for each user registered to the system, '1' is registered to a bit corresponding to a group to which the user belongs. In this connection, it may also be possible that a bit corresponding to a group to which the user belongs is set to '0' and a bit corresponding to a group to which the user does not belong is set to '1'. Namely, it is only necessary to discriminate groups to which the user belongs from those to which the user does not belong.

That is, the user management table of FIG. 3 indicates that a user, "Suzuki" belongs to groups 1 and 2, and the group control table of FIG. 2 indicates that group 1 is a manager group of the document management system and group 2 is a group of in-house users in the organization of the system.

Subsequently, description will be given of processing procedures of document registration and retrieval operations in the document management system of this embodiment.

First, in response to a registration command inputted from the keyboard 20, the system control program 100 initiates operation of the registration control program 110 to start document registration processing.

Processing of the document retrieval operation will be described by referring to PAD shown in FIG. 4.

First, the program 110 activates the text registration program 130 in step 1000.

The program 130 registers text data of the registration document to the text registration area 200 on the magnetic disk 70.

The registration control program 110 then invokes the data creation and registration program for retrieval data 140 in step 1010.

The program 140 produces retrieval data in accordance with the text data stored in the area 200 and then registers the data to the area 210 on the disk 70.

Finally, the program 110 starts the access control creation and registration program 150 in step 1020.

The program 150 registers bit information for documents which can be accessed by users belonging to respective groups as shown in FIG. 8 to thereby create an access control table and then registers the table to the area 220 on the disk 70 and then terminates operation of the program 110.

An outline of processing of the registration has been described.

Subsequently, description will be given of the contents of processing of the registration program by referring to a specific example.

Figure 5:
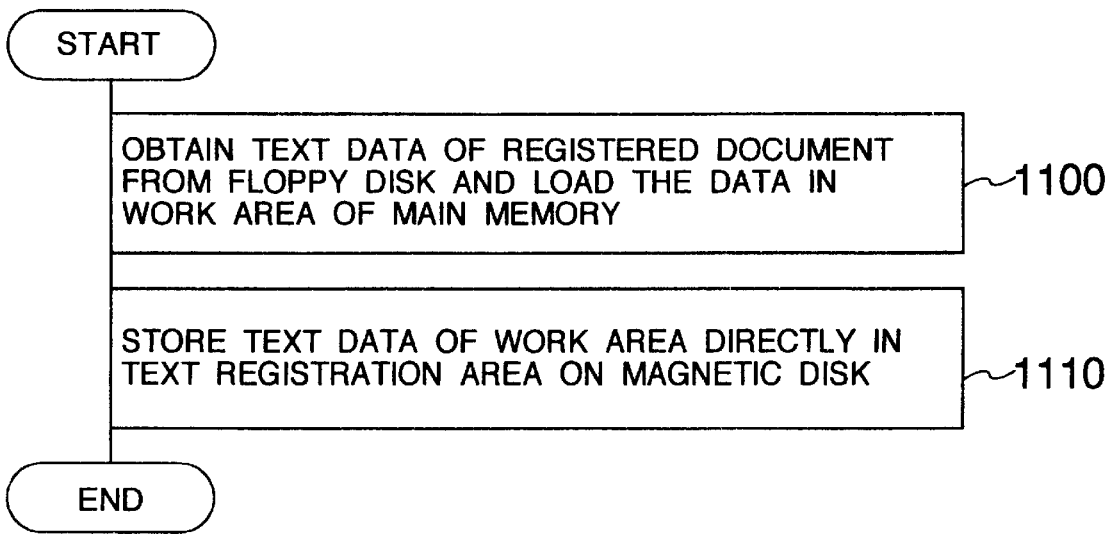
FIG. 5 is a program analysis diagram showing the contents of processing of the text registration program in an embodiment of the present invention.

First, the text registration program 130 reads, in step 110 as shown in FIG. 5, text data of the registration document from the floppy disk 50 installed in the floppy disk drive 40 and loads the data in the work area 190.

Thereafter, the program 130 registers in step 1110 the data loaded in the work area 190 to the area 200 on the disk 70 to thereby terminate processing of the program 130.

In this connection, although this embodiment includes a floppy disk, there may be used any other storage media on which information can be stored. Moreover, in this embodiment, the registration document may be inputted not only from the floppy disk 50 but also from another apparatus, for example, by use of a communication line (not shown in FIG. 1) in the configuration of the embodiment.

Next, the retrieval data creation and registration program 140 reads, in step 1200 as shown in FIG. 6, text data of the registration document stored in the area 200 of the disk 70 and loads the data in the work area 190.

The program 140 then creates in step 1210 retrieval data in the area 190 for the text data read in the area 190.

The retrieval data in this case is retrieval data for any one of various retrieval methods. For example, the data may be an index file to which words extracted from text data for index retrieval are registered or a learning file for a neuro-retrieval. Moreover, the data may conform to an n-gram method in which an index is created for partial character strings (n-gram) extracted from a text.

When the retrieval data is completely created, the program 140 registers in step 1220 the retrieval data created in the work area 190 to the area 210 of the disk 70 to thereby terminate processing of the program 140.

Finally, the access control table creation and registration program 150 reads in step 1300 as shown in FIG. 7 the group control table shown in FIG. 2 and loads the table in the area 190.

Furthermore, the program 150 loads in step 1310 the access control table shown in FIG. 8 in the area 190.

The program 150 then executes in step 1320 processing of step 1330 for all registration documents. That is, in step 1330, the program 150 refers to each entry of the group control table for each registration document and displays an outline of groups in step 1340.

The program 150 then determines in step 1350 whether or not the access is allowed for the pertinent group.

When the access is to be allowed, the program 150 sets in step 1360 '1' to the pertinent bit in the access control table, namely, there is recorded information that users belonging to the group are allowed to access the pertinent document. In other words, when the access right information is set to group 1 in association with a document with document number 7, '1' is set to an entry of group 1 corresponding to document number 7; whereas, '0' is kept unchanged in entries of other groups. Incidentally, it may also be possible that '0' is set to the pertinent bit and '1' is set to the other bits. Only the pertinent bit is required to be discriminated from the other bits.

When the processing above is completely finished for all registration documents, the program 150 deletes in step 1370 the group control table from the work area 190.

Finally, the program 150 registers in step 1380 the access control table generated in the area 190 to the area 220 on the disk 70 to thereby terminates the registration processing.

In this regard, it may also be possible to beforehand assign information identifying a group to a document to be registered such that in accordance with information assigned to a registration document to identify a group, the program 150 executes the access control determination processing.

The contents of processing in the document registration have been described.

Next, processing of the retrieval will be described.

When a retrieval command is inputted by a user via a network to the document management system in accordance with the present invention, the system control program 100 initiates the retrieval control program 120 to start document retrieval processing.

Figure 9:
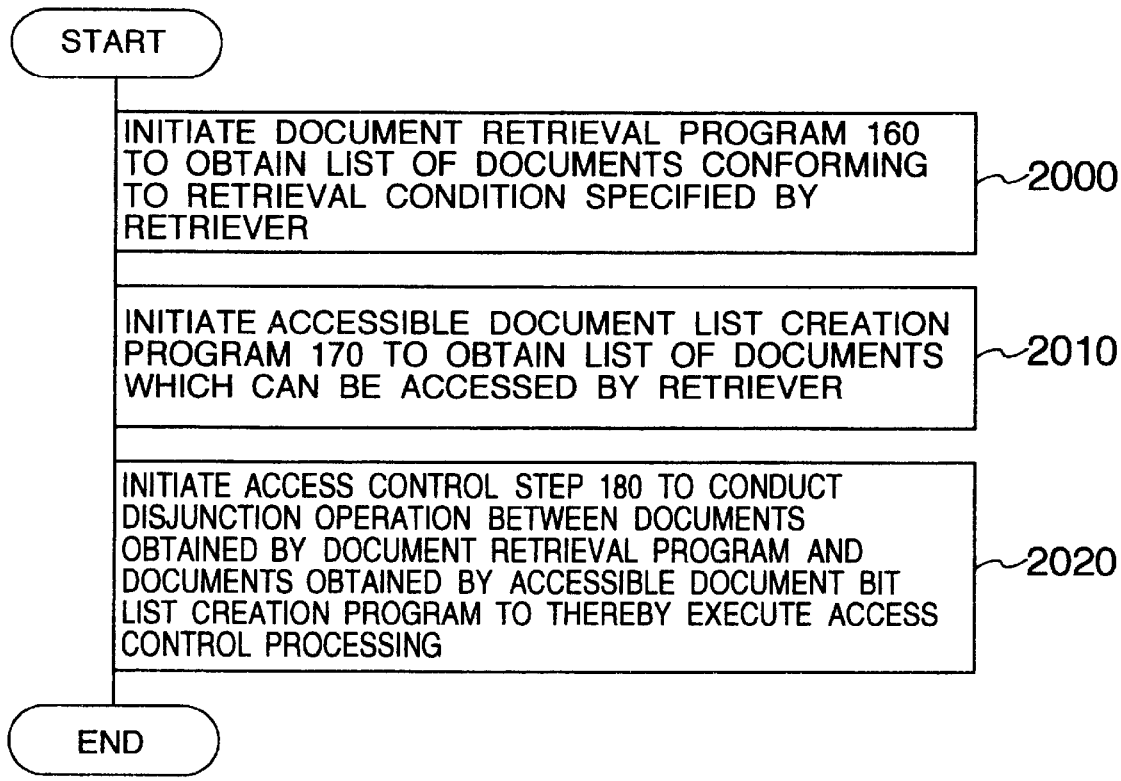
FIG. 9 is a program analysis diagram showing an outline of retrieval processing in an embodiment of the present invention.

Processing of document retrieval will be described by referring to PAD shown in FIG. 9.

First, the program 120 invokes the document retrieval program 160 in step 2000.

The program 160 refers to retrieval data under a retrieval condition specified by the user, obtains as a result of retrieval a list of documents associated with the retrieval condition, and stores the list in the work area 190.

Next, the program 120 initiates the accessible document list creation program 170 in step 2010 to attain an accessible document list, i.e., a list of documents which can be accessed by the user, and then stores the list in the area 190.

Finally, the program 120 starts the access control program 180 in step 2020. The program 180 accomplishes a disjunction operation between the list of retrieved documents created and stored in the area 190 by the document retrieval program and the accessible document list created and stored in the work area 190 by the program 170 to generate a list of retrieved documents after the access control determination, and returns the list to the user to thereby terminate the program 120.

An outline of processing of the retrieval has been described.

Next, the contents of processing of the retrieval program will be described by referring to a concrete example in a case in which a retrieval operation is conducted by a user with user name "Suzuki".

Figure 10:
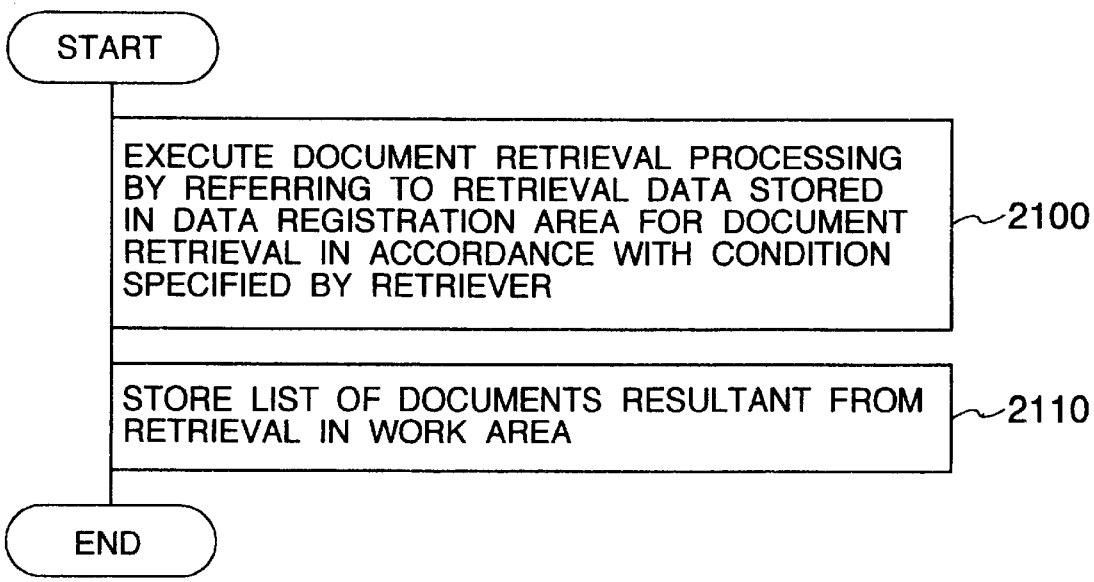
FIG. 10 is a program analysis diagram showing the contents of processing of the document retrieval program in an embodiment of the present invention.

First, the document retrieval program 160 analyzes a retrieval condition specified by the user in step 2100 as shown in FIG. 10 and refers to retrieval data in accordance with the retrieval condition to conduct document retrieval processing. The retrieval processing can be carried out in any kinds of retrieval methods such as an index retrieval, neuro-retrieval, and an n-gram retrieval methods. In addition, two or more kinds of retrieval methods may be employed in the document retrieval processing.

Thereafter, the program 160 stores in step 2110 the list of documents obtained as a result of retrieval in the work area 190 and then terminates processing of the program 160.

Figure 11:
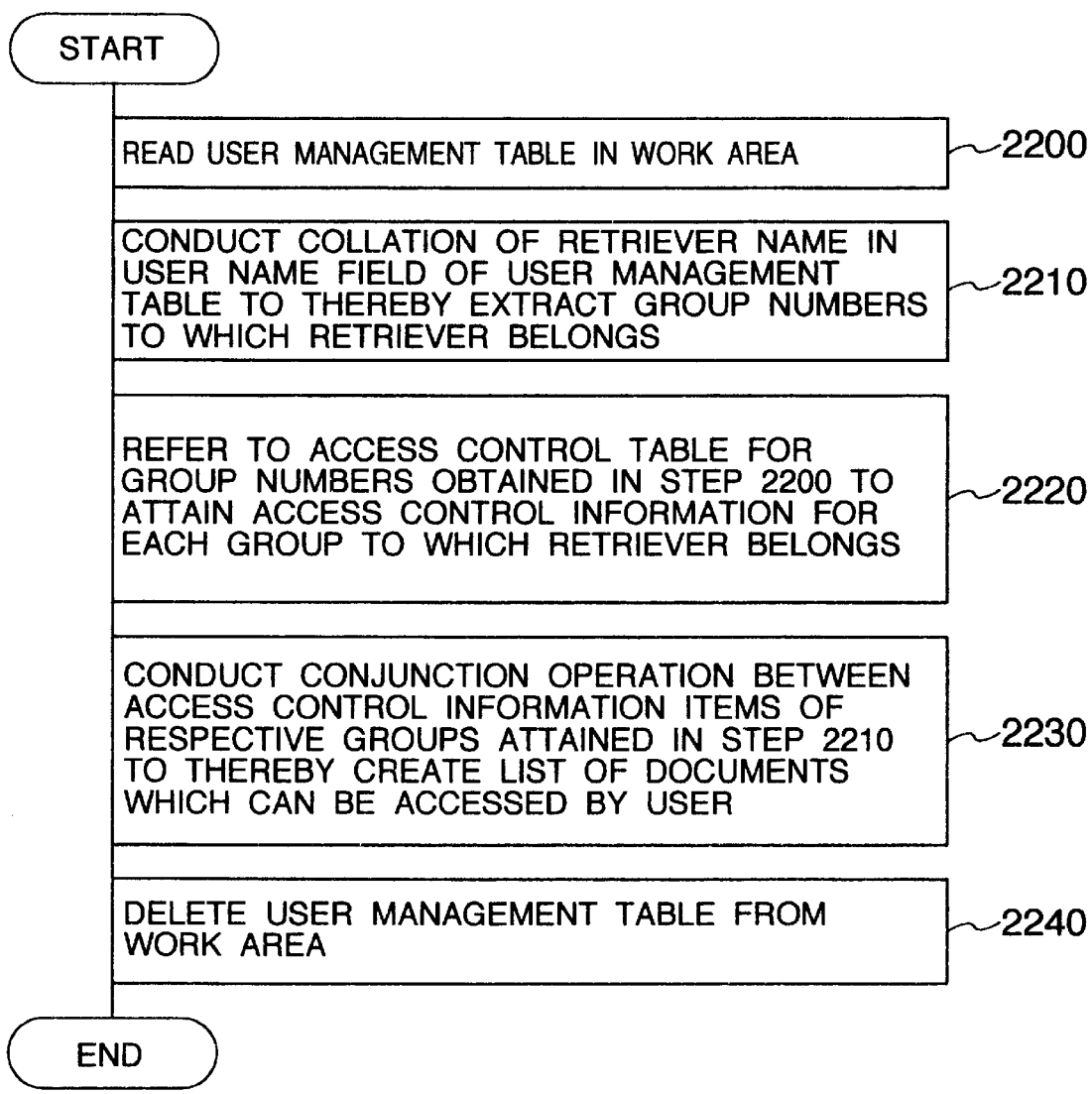
FIG. 11 is a program analysis diagram showing the contents of processing of the accessible document list creation program in an embodiment of the present invention.

Next, as shown in FIG. 11, the program 170 reads in step 2200 a user control table shown in FIG. 3 and stored in the area 240 on the disk 70 and loads the table in area 190 of the memory 60.

Thereafter, the program 170 accomplishes collation for a retriever name in a field of the user name of the user control table in the area 190 to extract a group number of a pertinent entry so as to obtain a group number associated with an access right of the retriever.

Namely, in the case of this example, "Suzuki" is obtained through the collation from the entry of the user name in the user control table to attain groups 1 and 2 as the pertinent group numbers.

Additionally, the program 170 refers in step 2220 to an entry in the access control table associated with the group number extracted in step 2210 to thereby obtain a list of documents which can be accessed by use of an access right of each group number. That is, in this example, the list of accessible documents is obtained by referring to entries of group numbers 1 and 2 in the access control table.

Moreover, the program 170 executes in step 2230 a conjunction operation between the lists of documents extracted in step 2220. Namely, in the case of "Suzuki", the operation is conducted between a document list corresponding to group 1 and a document list associated with group 2 to thereby create an accessible document list which is a list of documents which can be accessed by the retriever.

Thereafter, the program 170 stores in step 2240 the accessible document list to the area 190. Thereafter, the program deletes in step 2250 the user control table from the area 190 and then terminates the accessible document list creation program.

Figure 12:
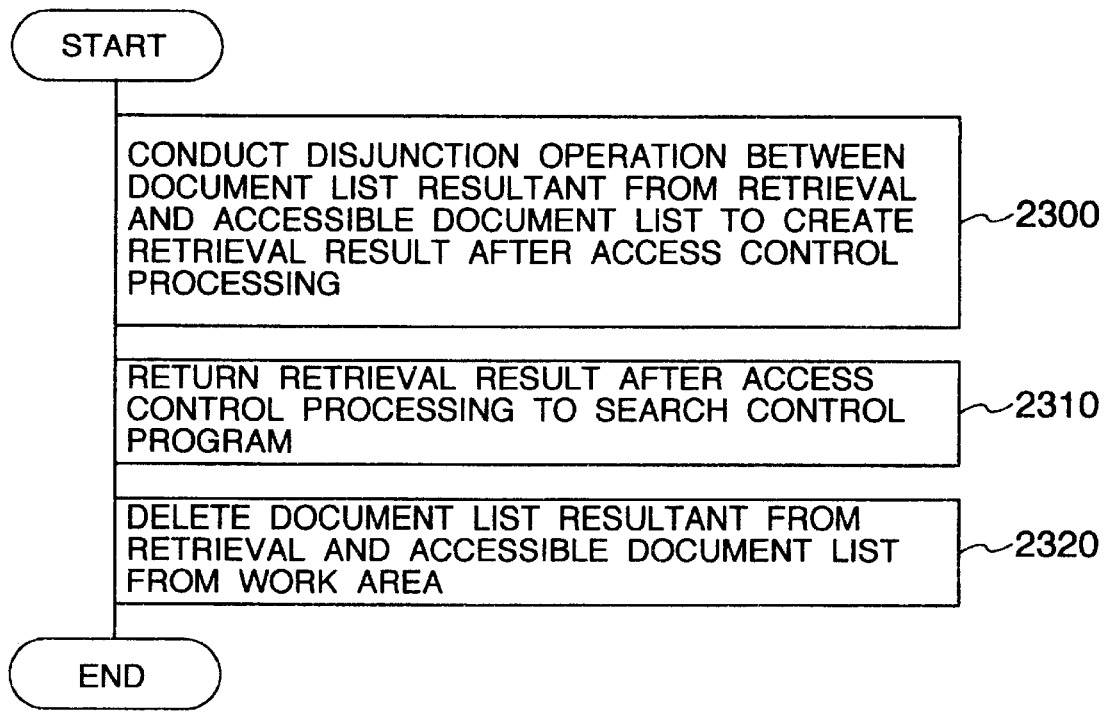
FIG. 12 is a program analysis diagram showing the contents of processing of the access control program in an embodiment of the present invention.

Finally, as shown in FIG. 12, the access control program 180 conducts a disjunction operation between the document list created in the area 190 in step 2300 as a result of retrieval by the document retrieval program 160 and the accessible document list created by the list creation program 170 to obtain a retrieval result of the access control processing.

The program 180 then returns in step 2310 the retrieval result of the processing to the retrieval control program 130.

Finally, the program 180 deletes in step 2320 the retrieval result document list and the accessible document list from the area 190 to thereby terminate the access control processing.

On receiving the retrieval result created through the access control processing, the retrieval control program 120 returns the retrieval result via the system control program 100 to the retriever and then terminates the retrieval processing. Description has been given of the contents of processing of document retrieval in the present embodiment.

Although the access control table is established for each group in this embodiment, the table may be set for each user identifier information. This makes it possible to conduct the access control operation at a personal level.

Additionally, in accordance with the present invention, the unit of access control operation is also applied not only to the referring operation to a document but also to an editing operation of a document. In this regard, the editing operation includes deletion, writing, addition, etc. of texts.

As above, in accordance with the present embodiment, for each group to which users registered to the document management system belong, accessible documents are registered as an access control table at document registration.

Under this condition, when a retriever desires to retrieve a document, information of accessible documents of a group to which the retriever belongs is extracted to accomplish the access control processing. Therefore, the access control operation can be achieved at a plurality of levels without dividing the database in accordance with the access control levels. In consequence, it is possible to provide a low-cost document management system having advantages in the operation management and maintenance thereof.

Additionally, a new access control level (corresponding to a group number in the embodiment) can be achieved by registering a new entry to the access control table. Consequently, there is provided a document management system having improved expandability when compared with the conventional method in which a new database is to be additionally registered in the document management system.

Incidentally, in the access control method in accordance with the present embodiment, the access control operation can be completed in the access right determination only by referring to entries (one megabit (Mbit)=125 kilobytes (kB) for one million document information items) of the access control table. In consequence, the retrieval response is rarely deteriorated for a large-sized document database.

In accordance with the present invention, accessible documents of each group to which users registered to the document management system belong are registered as an access control table at document registration and hence the access control operation can be achieved at a plurality of levels without dividing the database in accordance with the access control levels. Moreover, there is provided a low-cost document management system having advantages in the system operation management and maintenance.

Additionally, since a new access control level can be established by registering a new entry to the access control table, there can be provided a document management system having wider expandability when compared with the conventional method in which a new database is registered in the registration of a new entry.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method for retrieving information documents satisfying a retrieval condition inputted by a user from among information documents stored in an information system, comprising the steps of:

referring to retrieval data prepared and registered based on contents of information documents in said information system, and extracting based on said retrieval data a first set of attribute information each of the attribute information representing each of information documents matched with said retrieval condition designated by said user;

referring to plural sets of attribute information, each set thereof consisting of attribute information of information documents accessible by each of a plurality of groups to which said user belong, and extracting from said plural sets of attribute information a second set of attribute information each of the attribute information representing each of information documents accessible by said groups to which said user belongs;

performing a conjunction operation between said first set of attribute information and said second set of attribute information to obtain information documents belonging to both said first and second sets of attribute information as a retrieval result of said retrieval condition inputted by said user, wherein said first set of attribute information varies according to said retrieval condition designated by said user.

2. A method for retrieving information documents satisfying a retrieval condition designated by a user from among information documents stored in an information system and accessible by the user, comprising the steps of:

referring to retrieval data prepared and registered based on contents of information documents in said information system, and extracting based on said retrieval data a first set of attribute information each of the attribute information representing each of information documents matched with said retrieval condition designated by said user;

referring to plural sets of attribute information, each set thereof consisting of attribute information of information documents accessible by each of a plurality of groups to which said user belong, and extracting from said plural sets of attribute information a second set of attribute information each of the attribute information representing each of information documents accessible by said groups to which said user belongs;

performing a conjunction operation between said first set of attribute information and said second set of attribute information to obtain information documents belonging to both said first and second sets of attribute information as a retrieval result of said retrieval condition inputted by said user, whereby said obtained information documents belonging to both said first and second sets of attribute information correspond to information documents satisfying said retrieval condition and accessible by said user, wherein said first set of attribute information varies according to said retrieval condition designated by said user.

3. A method for retrieving information documents satisfying a retrieval condition designated by a user from among information documents stored in an information system and accessible by the user, comprising the steps of:

preparing and registering retrieval data based on contents of information documents in said information system, extracting based on said retrieval data a first set of attribute information according to said retrieval condition designated by said user;

referring to plural sets of attribute information, each set thereof consisting of attribute information of information documents accessible by each of a plurality of groups to which said user belong, and extracting from said plural sets of attribute information a second set of attribute information each of the attribute information representing each of information documents accessible by said groups to which said user belongs;

performing a conjunction operation between said first set of attribute information and said second set of attribute information to obtain information documents belonging to both said first and second sets of attribute information as a retrieval result of said retrieval condition inputted by said user, wherein said first set of attribute information varies according to said retrieval condition designated by said user.

* * * * *